FIG I

INVENTOR.
DONALD L. MARTIN
BY Moody and Goldman
ATTORNEYS

INVENTOR.
DONALD L. MARTIN
BY Moody and Goldman
ATTORNEYS 2,961,533

SYNCHRONIZING FREQUENCY CONTROL SYSTEM

Donald L. Martin, Northridge, Calif., assignor to Collins Radio Company, Cedar Rapids, Iowa, a corporation of Iowa Filed Apr. 13, 1959, Ser. No. 805,907

5 Claims. (Cl. 250—20)

This invention relates generally to automatic-frequency-control circuits capable of providing phase stabilization and is used with signals having a pilot tone, or a carrier frequency.

Prior automatic-frequency-control systems which provide phase stability generally require a phase-detector component with a feedback loop which varies the frequency of an oscillator regulated by a reactance tube or saturable reactor. Neither a phase detector, nor a feedback loop, nor a regulated oscillator, is required by the invention.

An object of the present invention is to provide a system which locks the phase and frequency of a received tone or carrier accompanying a signal, with respect to the output of a local reference oscillator.

It is another object of this invention to provide an automatic-frequency-control circuit which can correct for Doppler shift of a received signal.

It is still another object of this invention to provide a system which permits correlation detection of a received signal without requiring an extremely high order of stability for its local oscillators.

In summary, the present invention obtains phase stability by generating a heterodyning signal in such a way that it contains a cumulative phase and frequency component which cancels the error from a received signal during a heterodyning operation. The cumulative error is determined with respect to reference oscillator, locally provided.

In order to generate the compensating heterodyning signal, the signal tone or carrier is mixed with an output of a heterodyning oscillator; and their difference signal is selected as an input to second and third frequency mixers. The reference oscillator output is provided also as an input to the second and third mixers. However, means is provided to phase-shift by 90° the output of the third mixer with respect to the output of the second mixer. A pair of balanced modulators respectively receive the difference outputs of the second and third mixers.

Further, each balanced modulator also receives a respective output from the heterodyning oscillator. However, the heterodyning oscillator output provided to the second balanced modulator is phase-shifted by 90° with respect to the like output received by the first modulator. The outputs of the balanced modulators are linearly combined at the same magnitude to provide the compensating heterodyning frequency, which is equal to the sum of the frequencies of the heterodyning oscillator and the error. Hence, the combined frequency heterodynes the received signal to provide a frequency and phase corrected output signal.

Figure 1:
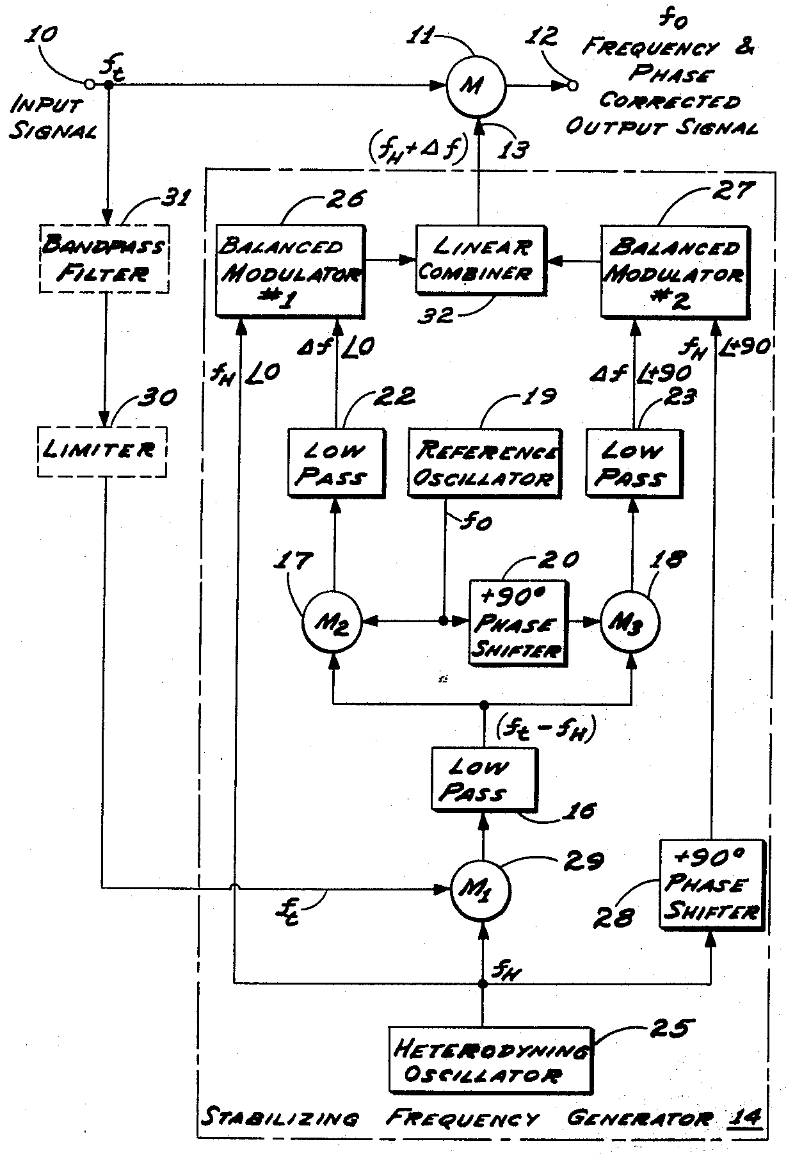
Figure 2:
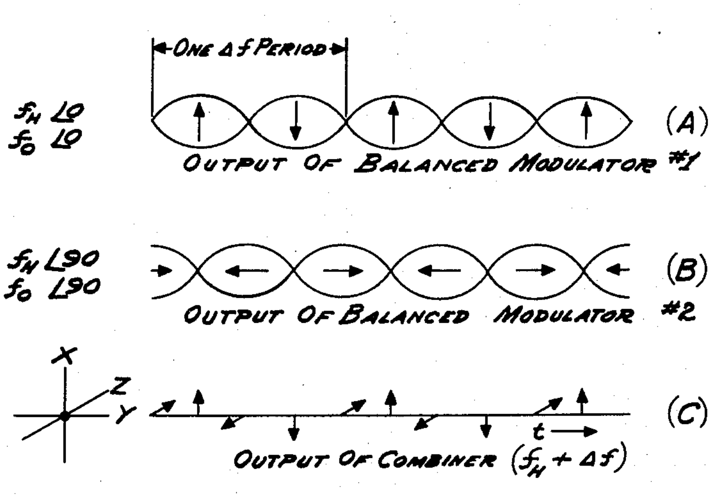
Figure 3:
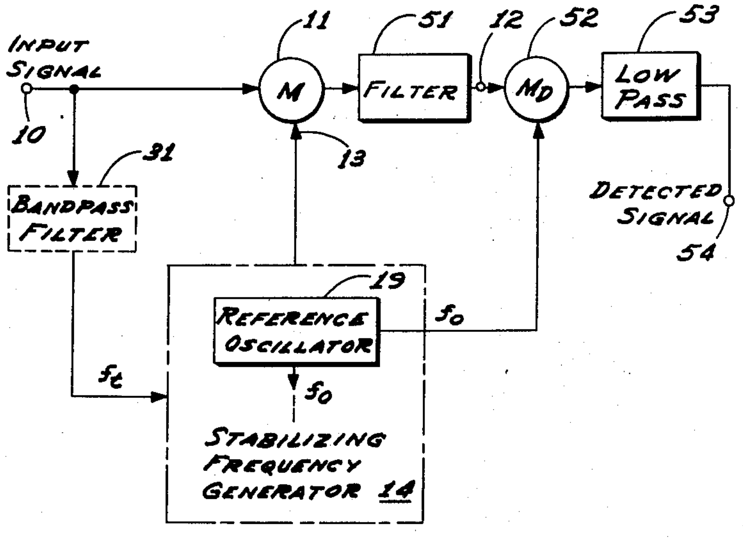

Further objects, features, and advantages of this invention will become apparent to one skilled in the art upon further study of the specification and accompanying drawing, in which:

Figure 1 illustrates a block diagram of a form of the invention;

Figures 2(A), (B) and (C) illustrate vector-phase relationships which aid in explaining the operation of the invention; and Figure 3 shows an extended form of the invention.

Now referring to Figure 1, an input signal is received at a terminal 10 and may include a carrier, full or partly suppressed, of a single-sideband or an amplitude-modulated signal, or a pilot tone of any type of signal. The input signal provided at terminal 10 is presumed to have been previously filtered so as to be segregated from other signals having undesired frequencies, such as by having been passed through an I.F. amplifier.

A mixer 11 has one input connected to terminal 10 to receive the input signal. Mixer 11 has another input 13 which receives a frequency $(f_H+\Delta f)$ from a stabilizing-frequency generator 14 that heterodynes the input signal to a value, wherein its carrier (or tone) is maintained at the frequency and phase of a reference frequency $f_0$, provided by a reference oscillator 19. Thus, a heterodyned phase stabilized output signal is provided to an output terminal 12.

A band-pass filter 31, which is optional, is tuned to the tone (or carrier) frequency $f_t$ and is connected between input terminal 10 and an input of generator 14. Band-pass filter 31 further filters the tone (or carrier) frequency $f_t$ from signal or sideband components where such filtering is necessary.

A mixer 29 within generator 14 receives the input frequency $f_t$ from filter 31. An optional amplitude limiter 30 may be connected between the output of filter 31 and mixer 29. A fixed heterodyning oscillator 25 provides a frequency $f_H$ to mixer 29. A low-pass filter 16 selects an output frequency, which is the frequency difference between its inputs. Accordingly, the output of low-pass filter 16 is a frequency $(f_t-f_H)$.

Second and third mixers 17 and 18 within generator 14, each have an input connected to an output of low-pass filter 16. In addition, each mixer receives a second input $f_0$ from fixed reference oscillator 19. However, the reference oscillator frequency $f_0$ provided to mixer 18 is phase-advanced by 90° by a phase-shifter 20. A pair of low-pass filters 22 and 23 respectively pass a difference frequency output from respective mixers 17 and 18. Thus, the output of each filter 22 or 23 is a frequency $\Delta f$, which equals $(f_t-f_H-f_0)$. Hence, frequency $\Delta f$ represents the cumulative frequency error of the input signal and heterodyning oscillator 25 relative to reference frequency $f_0$.

Due to the 90° phase-shift for the $f_0$ input to mixer 18, its output is phase-shifted 90° with respect to the output of mixer 17. Nevertheless, the important thing is that a 90° phase difference exists between the mixer outputs. This phase-shift could be obtained in other ways than that shown; for example, the other input to mixer 18 could have instead been phase-shifted 90°, or the output of mixer 18 could have been phase-shifted by 90°.

A pair of balanced modulators 26 and 27 receive the $\Delta f$ outputs of filters 22 and 23 respectively. Another input to each balanced modulator is frequency $f_H$ obtained from oscillator 25. However, a 90° phase-shifter 28 is serially connected between oscillator 25 and balanced modulator 27 in order to phase-advance the oscillator frequency provided to modulator 27.

The outputs of balanced modulators 26 and 27 are provided with equal magnitude to a linear combiner 32, which may be no more than a resistor. The combined signal has a frequency $(f_H+\Delta f)$ which is provided at input 13 of mixer 11 to heterodyne the input signal so that its carrier has the frequency and phase of the reference-oscillator frequency $f_0$. This is shown mathematically as follows:

In mixer 11, $$f_t-(f_H+\Delta f)=f_t-f_H-\Delta f$$

But by definition, $$\Delta f=f_t-f_H-f_0$$

Substituting, $$f_t - f_H - (f_t - f_H - f_o) = f_o$$

Therefore, input frequency $f_t$ is reduced to an output frequency $f_0$ equal to that of reference oscillator 19.

That the output of combiner 32 has frequency $(f_H+\Delta f)$ can further be shown with the assistance of Figures 2(A), (B) and (C). Figure 2(A) illustrates the envelope of the output of balanced modulator 26; while Figure 2(B) illustrates the envelope of the output of balanced modulator 27 phased by 90° relative to Figure 2(A). The vector arrows within the envelopes represent the relative phases of the modulated signals within the envelope. The reversals in vector direction between adjacent envelope portions illustrate the phase reversals occurring between adjacent envelope portions.

The $\Delta f$ input to each balanced modulator acts as its switching signal. It is well-known in the operation of a balanced modulator that its output signal is switched by 180° when its switching input passes through its alternating-current axis. Accordingly, if the error signal $\Delta f$ is presumed to have a frequency much lower than $f_H$, the phase variations in the waveforms in Figures 2(A) and (B) are obtained.

A linear combining of equal-amplitude outputs from the balanced modulators obtains a vector rotation by an amount of one revolution per period of the error $\Delta f$, which in effect increases the frequency $f_H$ by $\Delta f$ to provide output frequency $(f_H+\Delta f)$. A constant amplitude also results for frequency $(f_H+\Delta f)$ due to the linear addition of the two envelopes displaced by 90° of phase.

It is therefore noted that an important aspect in obtaining the injection frequency $(f_H+\Delta f)$ is the 90° phase relationships between the two balanced modulator outputs. In the illustrated embodiment, the phase differences are obtained by utilizing 90° phase-shifters as single block components. However, the same thing can be done, for example, with other amounts of phase-shifts injected discretely with the balanced-modulator inputs. For example, the $f_H$ input to modulator 26 might instead be phase-shifted by −45° and the $f_H$ input to modulator 27 be phase-shifted by +45° for a 90° total; and the same thing may be done with respect to the $\Delta f$ inputs to the balanced modulators. With this information, it will become apparent to one skilled in the art how different types of discrete phase-shifts can be provided to obtain the required 90° in each case.

Leading +90° phase-shifts are used in order to obtain the injection frequency $(f_H+\Delta f)$. If instead lagging −90° phase-shifts were used, the injection frequency would be $(f_H-\Delta f)$ at terminal 13; and the difference output of mixer 11 would contain twice the error rather than error cancellation. In such case, the summed output frequency of mixer 11 must be selected as its output, rather than its difference output frequency, to obtain error cancellation. Hence, discretion must be used in the type of phase-shift.

Since the heterodyned carrier of a received signal is stabilized at frequency $f_0$, certain types of signal modulations can be detected simply by a further heterodyning with the reference-oscillator frequency $f_0$. Signal modulations which can be detected in this manner are amplitude modulation with either full or partial carrier, and single-sideband modulation with either a full or partial carrier. Figure 3 illustrates a system for applying the invention for the detection of such modulated signals. A filter 51 may be provided between the output of mixer 11 and terminal 12 to select its stabilized output from undesired mixer products. A detecting frequency mixer 52 has one input connected to terminal 12 to receive the signal and has another input connected to an output of reference oscillator 19 to receive its frequency $f_0$. The difference output frequency from mixer 52 is the detected signal, and it is selected by low-pass filter 53, which provides it to output terminal 54.

Although this invention has been described with respect to a particular embodiment thereof, it is not to be so limited as changes and modifications may be made therein which are within the full intended scope of the invention as defined by the appended claims.

I claim:

1. A phase-sensitive automatic-frequency-control system for stabilizing a received signal, including a frequency mixer receiving said signal, comprising a stabilizing generator having a phase-stabilizing output connected to an input of said frequency mixer, said generator including a first mixer having one input receiving said signal, a heterodyning oscillator providing a second input to said first mixer, said first mixer having an output that is the frequency difference between its inputs, second and third mixers each having a first input receiving the output from said first mixer, a reference oscillator providing a second input to each of said second and third mixers, means providing a phase-shift of 90° between the second inputs to said second and third mixers, means for providing first and second outputs from said heterodyning oscillator with a phase-shift of 90° between them, first means for modulating the first output of said heterodyning oscillator with the output of said second mixer, second means for modulating the second output of said heterodyning oscillator with the output of said third mixer, a linear combining circuit connected to the outputs of said first and second modulating means to provide the phase-stabilizing output of said generator.

2. An automatic-frequency-control system providing phase stabilization with respect to a reference frequency provided by a local reference oscillator, comprising a heterodyning oscillator, a first frequency mixer receiving said input signal and connected to said heterodyning oscillator to provide a difference-frequency output, second and third frequency mixers, each having a pair of inputs, means connecting the difference-frequency output of said first mixer to an input of each of said second and third mixers, means coupling said reference oscillator to another input of each of said second and third mixers, first and second balanced modulators each having a pair of inputs and an output, first and second means connected to said heterodyning oscillator and providing outputs having a 90° phase-shift between them and being connected respectively to one input of each balanced modulator, first and second filtering means connected respectively between the outputs of said second and third mixers and the other inputs of said first and second balanced modulators, means providing a 90° phase shift between the respective outputs of said filtering means, means for linearly combining the outputs of said balanced modulators, and means for frequency mixing the received signal with an output of said combining means to provide a phase-stabilized signal that is locked with said reference frequency.

3. A phase-stabilized automatic-frequency-control system as defined in claim 2 including a low-pass filter coupled between the output of said first mixer and the respective inputs to said second and third mixers.

4. A phase-stabilized automatic-frequency-control system as defined in claim 2 in which said first and second means are a direct-connection and a 90° phase-shifter respectively, and said first and second filtering means are low-pass filters.

5. A system as defined in claim 4 in which said means providing a 90° phase-shift between outputs of said filtering means comprises means providing a 90° phase shift between the reference frequency inputs of said second and third mixers.

References Cited in the file of this patent

UNITED STATES PATENTS

| | | |
|---|---|---|
| 2,772,350 | Deardorff | Nov. 27, 1956 |
| 2,797,314 | Eglin | June 25, 1957 |